United States Patent [19]

Meyer et al.

[11] Patent Number: 5,132,007
[45] Date of Patent: Jul. 21, 1992

[54] CO-GENERATION SYSTEM FOR CO-PRODUCING CLEAN, COAL-BASED FUELS AND ELECTRICITY

[75] Inventors: Lee G. Meyer; Gerald F. Cavaliere, both of Englewood, Colo.

[73] Assignee: Carbon Fuels Corporation, Englewood, Colo.

[21] Appl. No.: 528,303

[22] Filed: May 25, 1990

Related U.S. Application Data

[63] Continuation-in-part of Ser. No. 355,528, May 23, 1989, Pat. No. 5,021,148, and a continuation-in-part of Ser. No. 277,603, Nov. 28, 1988, Pat. No. 4,938,782, and a continuation-in-part of Ser. No. 84,270, Aug. 11, 1987, Pat. No. 4,787,915, and a continuation-in-part of Ser. No. 59,288, Jun. 8, 1987, Pat. No. 4,832,831.

[51] Int. Cl.⁵ .............................................. C10G 1/00
[52] U.S. Cl. .................................... 208/427; 208/431; 208/433; 44/282
[58] Field of Search ................... 208/431, 433, 427; 44/282

[56] References Cited

U.S. PATENT DOCUMENTS

| | | | |
|---|---|---|---|
| 4,687,570 | 8/1987 | Sundaram et al. | 208/431 |
| 4,842,719 | 6/1989 | MacArthur et al. | 208/431 |
| 4,938,782 | 7/1990 | Meyer et al. | 208/431 |
| 5,021,148 | 6/1991 | Meyer et al. | 208/431 |

Primary Examiner—Jacqueline Howard
Attorney, Agent, or Firm—Lee G. Meyer

[57] ABSTRACT

A method for preparing coal-derived fuel compositions while simultaneously producing electricity by utilizing a novel co-generation configuration employing the hydrodisproportionation of coal. Hydrodisproportionation is the short residence time decomposition and volatilization of coal to produce liquid coproducts, minimizing char and gas production without utilization of external hydrogen, that is, hydrogen other than that contained in the coal feedstock. The char produced is gasified to simultaneously produce steam for electrical power generation and syngas to produce methanol in a once-through process. The methanol purge gas is used as a fuel gas for a gas-driven power generating turbine. The waste heat from the power generation is used as the process heat for hydrodisproportionation.

9 Claims, 2 Drawing Sheets

CO-GENERATION SYSTEM FOR CO-PRODUCING CLEAN, COAL-BASED FUELS AND ELECTRICITY

TECHNICAL FIELD

This application is a continuation-in-part of U.S. Pat. application Ser. No. 355,528 filed May 23, 1989, now U.S. Pat. No. 5,021,148 issued Jun. 4, 1991 and of its parent, U S. Pat. application Ser. No. 277,603 filed Nov. 28, 1988 now U.S. Pat. No. 4,938,782 issued Jul. 3, 1990 and of its parent, U.S. Pat. application Ser. No. 084,270 filed Aug. 11, 1987 now U.S. Pat. No. 4,787,915 issued Nov. 29, 1988, and of its parent U.S. Pat. application Ser. No. 059,288 filed Jun. 8, 1987, now U.S. Pat. No. 4,832,831 issued May 23, 1989.

These parent, grandparent, great-grandparent, and great-great-grandparent applications, which are incorporated in their entirety by reference as if they were completely set out herein, disclose a coal refining process which economically produces a slate of clean burning value-added products. One process configuration produces non-polluting, fluidic, completely combustible, transportable fuel compositions derived from coal, which compositions contain particulate coal char admixed with liquids obtained from short residence time hydrodisproportionation of coal.

The parent application discloses a partial liquefaction scheme using short residence time hydrodisproportionation to produce petroleum substitutes.

The grandparent application relates to a rapid volatilization of the coal particle followed by an uncatalyzed hydrogenation reaction to conserve hydrogen and increase liquid yield.

The great-grandparent application further discloses that the process method can be altered to vary the product and co-product distribution as well as the rheological characteristics of the fuel system.

The great-great-grandparent discloses that the method of processing the coal, and specifically hydrodisproportionation, is important in determining both the economics of the process and the slate of value-added co-products.

The ancestor applications, as a whole, relate to volatilization of coal to produce char and liquid co-products without utilization of external hydrogen. i.e., hydrogen other than that contained in the coal feedstock, and more particularly to an improved method of economically producing uniform, fluidic, oil-type transportable fuel systems and fuel compositions and a slate of "value-added" co-products by a coal refining process employing short residence time, high heating rate, hydrogen rearrangement (hydrodisproportionation).

The instant invention relates to a novel method for preparing a clean, coal-based fuels by refining a coal feedstock, followed by gasification of at least part of the char produced for oxygenated fuel production, while simultaneously producing electricity by utilizing a novel co-generating configuration. Coal of various ranks is used to generate electrical power and, simultaneously, to manufacture coal-derived fuels, including petroleum substitutes and oxygenated fuels such as methanol. More particularly, the instant invention relates to a co-generation system which produces electricity and which uses waste heat as process heat to produce high energy, non-polluting, coal-derived fuels and chemical feedstocks derived substantially from coal.

BACKGROUND ART

Coal is the world's most abundant fossil fuel. However, coal has three major drawbacks: (1) Coal is a solid and is less easily handled and transported than fluidic or gaseous materials; (2) Coal contains compounds which, on burning, produce the pollutants associated with acid rain; and (3) Coal is not a uniform fuel product, varying in characteristics from region to region and from mine to mine.

In fossil fuels, the ratio of hydrogen atoms to carbon atoms is most important in determining the heating value per unit weight. The higher the hydrogen content, the more liquid (or gaseous) the fuel, and the greater its heat value. Natural gas, or methane, has a hydrogen-to-carbon ratio of 4 to 1 (this is the maximum); gasoline has a ratio of almost 2.2 to 1; petroleum crude about 2.0 to 1; shale oil about 1.5 to 1; and coal about 1 to 1.

The lignites, peats, and lower calorific value subbituminous coals have not had an economic use except in the vicinity of the mine site, for example, mine mouth power generation facilities. This is due primarily to the cost of shipping a lower Btu product as well as to the danger of spontaneous combustion because of the high content of volatile matter and high percentage of moisture which is characteristic of such coals. The risk of spontaneous combustion is increased by dehydration, even by the non-evaporation methods. Therefore, in order to secure stability of the dehydrated coal in storage and transportation, it has been necessary to cover the coal with an atmosphere of inert gas such as nitrogen or combustion product gas, or to coat it with crude oil so as not to reduce its efficiency as a fuel. However, these methods are not economical.

Waste coal has somewhat different inherent problems from those of the low-rank coals. Waste coal is sometimes referred to as a "non-compliance coal" because it is too high in sulfur per unit heat value to burn in compliance with the United States Environmental Protection Agency (EPA) standards. Other waste coal is too low in heat value to be transported economically. This coal represents not only an environmental problem (because it must be buried or otherwise disposed of), but also is economically unattractive.

The inefficient and expensive handling, transportation and storage of coal (primarily because it is a solid material) prevent coal from being an economically exportable product and cause the conversion of oil-fired systems to coal to be economically unattractive. Liquids are much more easily handled, transported, stored and fired into boilers.

Besides being difficult to transport, coal is a heterogeneous fuel, i.e, coal from different reserves has a wide range of characteristics and quality. Coal from one region (or even of a particular mine) cannot be efficiently combusted in boilers designed for coal from another source. Boilers and pollution control equipment must either be tailored to a specific coal or configured to burn a wide variety of material with a loss in efficiency.

The non-uniformity and transportation problems are compounded by the presence of combustion pollutants in coal, such as sulfur and nitrogen compounds which are thought to cause acid rain. The sulfur compounds are of two types: organic and inorganic (pyritic), both of which produce $SO_x$. The fuel bound nitrogen, i.e., organic nitrogen in the coal, combusts to form $NO_x$.

Further, because of the non-uniformity of coal it combusts with "hot spots" which results in some of the nitrogen in the combustive air (air is 75% nitrogen by weight) being oxidized to produce $NO_x$. This so-called "thermal $NO_x$" has heretofore only been reduced by expensive boiler modification systems.

Raw coal cleaning has heretofore been available to remove inorganic ash and sulfur but has been unable to remove the organic nitrogen and organic sulfur compounds which, upon combustion, produce the $SO_x$ and $NO_x$ pollutants. Heretofore fluidized bed boilers, which require limestone as an $SO_x$ reactant, and scrubbers or $NO_x$ selective catalytic convertors (so-called combustion, and post-combustion clean air technologies) have been the main technologies proposed to alleviate these pollution problems. These devices clean the combustion and flue gas rather than the fuel and are tremendously expensive from both capital and operating standpoints, adding to the cost of power. This added power cost not only increases the cost of domestically produced goods, but also ultimately diminishing this nation's competitiveness with foreign goods. Moreover, operation of post-combustion pollution control equipment draws on the power generated in the plant, reducing saleable plant output. This inefficiency results in higher production of $CO_2$ per unit of power available for sale. Carbon dioxide has been linked by some with the "greenhouse" effect, i.e., the warming of the earth's atmosphere.

It would, therefore, be advantageous to clean up the coal by removing the organic nitrogen (fuel nitrogen), as well as the organic sulfur while providing a uniform, highly reactive fuel which burns at a lower temperature, thereby reducing the production of thermal $NO_x$.

In order to overcome some of the inherent problems with coal as a solid fuel, various methods have been proposed for converting coal to synthetic liquid or gaseous fuels. These liquefaction "synfuel" processes are capital intensive and require a great deal of externally supplied water and external hydrogen, i.e., hydrogen and water provided from other than the coal feedstock. The processes are also energy intensive in that most carbon atoms in the coal matrix are converted to hydrocarbons, i.e., no pure carbon. This differs markedly from merely "rearranging" existing hydrogen in the coal molecule as in hydrodisproportionation which hydrogenates certain carbon atoms at the expense of other carbon atoms.

Coal pyrolysis is a well-known process whereby coal is thermally volatilized by heating the coal out of contact with air. Different pyrolysis products may be produced by varying the conditions of temperature, pressure, atmosphere, and/or material feed. Traditional pyrolysis has produced very heavy hydrocarbon tars and carbon (char), with the liberation of hydrogen.

In prior art pyrolysis, as shown in FIG. 2, the pulverized coal is heated relatively slowly at low heating rates and for long residence times such that the coal molecule undergoes a slow decomposition at reaction rate "$k_1$" to yield "decomposition" products, primarily free radical hydrocarbon fragments. These "decomposition" products undergo a rapid recomposition or "condensation" reaction at reaction rate "$k_2$", producing char and dehydrogenated hydrocarbons, and liberating hydrogen. The decomposition reaction is not desirable in a refining type process because it liberates valuable hydrogen instead of utilizing it to upgrade the hydrocarbon products. As shown in FIG. 2, when heating is slower such that $k_1$ (relatively slow reaction rate) and $k_2$ (relatively more rapid reaction rate) overlap, the dehydrogenation of the decomposition product, i.e., condensation reaction, is predominant. It is believed that when the decomposition reaction take place slowly, this reaction and the condensation reaction will take place within the coal particle where there is little hydrogen present to effect the hydrogenation reaction. This results in the production of heavy tar-like liquids of limited utility.

Prior art hydropyrolysis of bituminous and subbituminous coals of various ranks attempted to hydrogenate decomposition products through the use of external hydrogen. This process, sometimes called "partial liquefaction", has been carried out in both the liquid and gaseous phases. As used herein, "partial liquefaction" is meant to include all thermally based coal conversion processes, whether catalyzed or not, wherein a partial pressure of hydrogen is present. In order to promote hydrogenation, more stringent reaction conditions were required, reducing the economic viability. Examples of such processes are disclosed in U.S. Pat. Nos. 4,704,134; 4,702,747; and 4,475,924. In such processes, coal is heated in the presence of hydrogen or a hydrogen donating material to produce a carbonaceous component called char and various hydrocarbon-containing oil and gas components. The most economical of these processes take place under milder conditions; however, these processes have had only limited success. As in pyrolysis, if the heating rates are not rapid, the decomposition material remains inside the coal particle and can not be hydrogenated by external hydrogen without use of extreme temperatures and pressures. This substantially increases the cost and effectively makes these processes "liquefaction" processes.

In "liquefaction" processes, coal is treated with hydrogen to produce petroleum substitutes. These processes, which have been known for many years, have typically mixed crushed coal with various solvents, with or without catalysts; heated the mixture to reaction temperature; and reacted the coal and hydrogen at high pressure and long residence times. "Liquefaction" processes require high pressure, usually above 2,000 psig; require long reaction residence times, 20 minutes to about 60 minutes; consume large quantities of expensive externally generated hydrogen; and produce large amounts of light hydrocarbon gases. Solvent addition and removal, catalyst addition and removal, high pressure feed system, high pressure long residence time reactors, high hydrogen consumption, and high pressure product separation and processing have made these processes uneconomical in today's energy market.

A particular type of coal hydropyrolysis, flash hydropyrolysis, is characterized by a very short reactor residence time of the coal. Short residence time (SRT) processes are advantageous in that the capital costs are reduced because the feedstock throughput is so high. In SRT processes, high quality heat sources are required to effect the transformation of coal to char, liquids and gases.

In many processes, hydrogen is oxidized within the reactor to gain the high quality heat. However, the oxidation of hydrogen in the reactor not only creates water but also reduces the hydrogen available to hydrogenate hydrocarbons to produce higher quality fuels. Thus, in prior art processes, either external hydrogen is required or the product is degraded because valuable hydrogen is converted to water.

The prior art methods of deriving hydrogen for hydropyrolysis or liquefaction are by: (1) purchasing or generating external hydrogen, which is very expensive; (2) steam-methane reforming followed by shift conversion and $CO_2$ removal as disclosed in a paper by J. J. Potter of Union Carbide; or (3) char gasification with oxygen and steam followed by shift conversion and $CO_2$ removal as disclosed in a paper by William J. Peterson of Cities Service Research and Development Company.

All three of these hydrogen production methods are expensive, and a high temperature heat source such as direct $O_2$ injection into the hydropyrolysis reactor is still required to heat and devolatilize the coal. In the prior art processes, either carbon (char) is gasified by partial oxidation such as in a Texaco gasifier (U.S. Pat. No. 4,491,456 to Schlinger and U.S. Pat. No. 4,490,156 to Marion et al.), or oxygen was injected directly into the reactor. One such system is disclosed in U.S. Pat. No. 4,415,431 (1983) of Matyas et al. When oxygen is injected directly into the reactor, it preferentially combines with hydrogen to form heat and water. Although this reactor gives high-quality heat, it uses up hydrogen which is then unavailable to upgrade the hydrocarbons. This also produces water that has to be removed from the reactor product stream and/or floods the reactor. Additionally, the slate of hydrocarbon co-products is limited.

Flash hydropyrolysis has additional drawbacks in that the higher heating rates needed for short residence times tend to thermally hydrocrack and gasify the material at lower pressures. This gasification reduces liquid yield and available hydrogen. Thus, attempts to increase temperature to effect flash reactions tended to increase the hydrocracking of the valuable liquids to gases.

Thus, it would be advantageous to have a means for producing: (1) a high-quality heat for volatilization, (2) hydrogen, (3) other reducing gases prior to the reaction zone without producing large quantities of water and without using up valuable hydrogen, and (4) high quality liquid hydrocarbons.

In U.S. Pat. Nos. 4,671,800; 4,658,936; 4,832,831; and 4,878,915, it is disclosed that coal can be subjected to pyrolysis or hydropyrolysis under certain conditions to produce a particulate char, gas and a liquid organic fraction. The liquid organic fraction is rich in hydrocarbons, is combustible, can be beneficiated and can serve as a liquid phase for a carbonaceous fluidic fuel system. The co-product distribution, for example, salable hydrocarbon fractions such as BTX and naphtha, and the viscosity, pumpability and stability of the fluidic fuel when the char is admixed with the liquid organic fraction are a function of process and reaction parameters. The rheology of the fuel system is a function of solids loading, sizing, surfactants, additives, and oil viscosity.

Common volatilization reactors include the fluidized bed reactor which uses a vertical upward flow of reactant gases at a sufficient velocity to overcome the gravitational forces on the carbonaceous particles, thereby causing movement of the particles in a gaseous suspension. The fluidized bed reactor is characterized by large volumes of particles accompanied by long, high-temperature exposure times to obtain conversion into liquid and gaseous hydrocarbons. Thus, this type of reactor is not very conducive to short residence time (SRT) processing and may produce a large quantity of polymerized (tar-like) hydrocarbon co-products.

Another common reactor is the entrained flow reactor which utilizes a high-velocity stream of reactant gases to impinge upon and carry the carbonaceous particles through the reactor vessel. Entrained flow reactors are characterized by smaller volumes of particles and shorter exposure times to the high-temperature gases. Thus, these reactors are useful for SRT-type systems.

In one prior art two-stage entrained flow reactor, a first stage is used to react carbonaceous char with a gaseous stream of oxygen and steam to produce hydrogen, oxides of carbon, and water. These products continue into the second stage where volatile-containing carbonaceous material is fed into the stream. The carbonaceous feed reacts with the first-stage gas stream to produce liquid and gaseous hydrocarbons, including large amounts of methane gas and char.

Prior art two-stage processes for the gasification of coal to produce primarily gaseous hydrocarbons include U.S. Pat. Nos. 4,278,445 to Stickler; U.S. Pat. No. 4,278,446 to Von Rosenberg, Jr.; and U.S. Pat. No. 3,844,733 to Donath. U.S. Pat. No. 4,415,431 issued to Matyas et al. shows use of char as a carbonaceous material to be mixed with oxygen and steam in a first-stage gasification zone to produce a synthesis gas. Synthesis gas, along with additional carbonaceous material, is then reacted in a second-stage hydropyrolysis zone wherein the additional carbonaceous material is coal to be hydropyrolyzed.

U.S Pat. No. 3,960,700 to Rosen describes a process for exposing coal to high heat for short periods of time to maximize the production of desirable hydrocarbons.

One method of terminating the volatilization reaction is by quenching the products either directly with a liquid or gas, or by use of a mechanical heat exchanger. In some cases, product gases or product oil are used. Many reactors, including those for gasification have employed a quench to terminate the volatilization reaction and prevent polymerizing of unsaturated hydrocarbons and/or gasification of hydrocarbon products. Some have employed intricate heat-exchange quenches, for example, mechanical devices to attempt to capture the heat of reaction. One such quench scheme is shown in U.S. Pat. No. 4,597,776 issued to Ullman et al. The problem with these mechanical quench schemes is that they introduce mechanical heat-exchanger apparatus into the reaction zone. This can cause tar and char accumulation on the heat-exchanger devices, thereby fouling the heat exchanger.

Thus, if the coal has a hydrogen-to-carbon ratio of 1, and if the hydrogens on half the carbons could be transferred or "rearranged" to the other half of the carbons, then the result would be half the carbons with 0 hydrogens and half with 2 hydrogens. The first portion of carbons (with 0 hydrogens) is char; the second portion of carbons (with 2 hydrogens) is a liquid product similar to a petroleum fuel oil. If this could be accomplished using only hydrogen inherent in the coal, i.e., no external hydrogen source, then the coal could be refined in the same economical manner as petroleum, yielding a slate of refined hydrocarbon products and char.

In a further attempt to alleviate the problems of transporting the energy from non-uniform, solid coal to the end use power generation facility, three methods have been suggested to "co-generate" electricity and another coal-derived product. In all three types, the co-generation facility is usually placed at mine mouth, or in close proximity thereto. In the first type, the coal is processed to create synthetic gas or liquid fuel which is fed to a gas turbine that generates electricity. The turbine is exhausted to a heat exchange which produces high temperature process steam for use as chemical process heat or the like. In a second type, coal is burned directly in a steam boiler to produce steam which drives a turbine. The turbine generates electricity and the exhaust is used as process heat for chemical processes or the like. The third type, the so-called "combined cycle cogeneration system", involves the production from coal of synthetic gas ("syngas") which is combusted in a gas turbine to produce electricity. The exhaust gas is heat exchanged to produce steam which drives a second electric generating turbine. The exhaust from this turbine is then used to produce process heat for a chemical plant or the like. Cogeneration facilities using the syngas approach have not been altogether successful since this process requires the conversion of all or substantially all of the coal to liquid or gas, which is energy intensive and expensive. Further, as with "synfuels", the product can be a transportation fuel which is easily pipeline transportable and too expensive to be utilized in stationary units. Another disadvantage has been that the electrical facility is limited by the marketability of the process heat generated. Thus, the electric generating facility must operate in conjunction with a chemical plant or some similar process heat user. Additionally, most power generating stations are based upon economies of scale in the 400 to 500 MW range. This has proven expensive in that the capital costs for excess capacity for combined cycle facilities are not justified unless the entire plant is utilized fully. The size of the plant also limits the site available for cogeneration facilities.

In short, the U.S. energy scene has focused on a number of individual solutions to a many-faceted problem. A fuel "systems" approach is necessary to fully utilize the nation's substantial coal reserves. By forming a modular co-generating system wherein waste heat is used to produce petroleum substitutes which can be readily transported by pipeline, tanker train or the like, all of the fuel is utilized efficiently and effectively, yielding flexibility in use and distribution.

It would be highly advantageous to first refine the coal to extract high quality, value-added hydrocarbon liquid products, which are useful as petroleum substitutes and/or chemical feedstocks, and use at least part of the remaining (char) carbons to produce methanol in a once-through process by gasification with oxygen to produce CO and $H_2$ from water, with the remaining gas being used for electric turbine fuel.

Methanol, when combined with ethanol and/or gasoline, creates a clean burning, motor vehicle fuel. Methanol is also a feedstock for producing methyl tertiary-butyl ether (MTBE), another oxygenated fuel additive which is currently used in cities such as Denver and Phoenix to reduce transportation caused carbon monoxide air pollution. This is important in this nation's campaign against pollution. Therefore, an inexpensive method of production of methanol from coal would be advantageous.

Making methanol from coal is well-known. In accordance with this process, methanol is made directly from coal and steam to initially form carbon monoxide and hydrogen in accordance with equation I:

$$HOH \text{ (steam)} + C \text{ (coal)} \rightarrow CO + H_2 \qquad \text{I.}$$

A portion of the gas is subjected to the shift reaction with steam to produce additional hydrogen in accordance with equation II:

$$CO + HOH \text{ (steam)} \rightarrow CO_2 + H_2 \qquad \text{II.}$$

The $CO_2$ is scrubbed from the gaseous product leaving primarily hydrogen. The hydrogen is admixed with gaseous products of equation I to produce a gas having a desired ratio of hydrogen to carbon monoxide from which methanol and similar products are synthesized catalytically.

In the methanol synthesis plant, carbon monoxide and hydrogen are combined to produce methanol. These constituents have heretofore only been economically available from natural gas. The synthesis of methanol is described in pages 370-398 of Vol. 13 of the KIRK-OTHMER ENCYCLOPEDIA OF CHEMICAL TECHNOLOGY, second edition, Anthony Standin, editor, Interscience Publishers, New York, 1969, Vol. 5. The carbon monoxide and hydrogen are controlled in a ratio and temperature-pressure combination to obtain maximum yields of the methanol fuel product. Other methods for methanol synthesis at lower temperatures and pressures are also known as, for example, the ICI low pressure process described in "Here's How ICI Synthesizes Methanol at Low Pressure", *Oil and Gas Journal*, Vol. 66, pp. 106-9, Feb. 12, 1968. The problem with these prior art methods is that the production of the starting materials, i.e., CO and $H_2$, from coal was very expensive.

Thus, it would be highly advantageous to have a process which uses only coal and a small quantity of external water to easily and efficiently produce large quantities of methanol; syngas for turbine electrical generation; a clean burning fluidic boiler fuel; and a slate of co-products useful as petroleum substitutes or chemical feedstocks including benzene, toluene, xylene (BTX); ammonia; sulfur; naphtha; fuel oil; and the like.

Further, it would be highly advantageous to have a process for refining coal wherein short residence times and internally generated hydrogen are used in mild conditions to efficiently produce hydrocarbon liquids and to efficiently and economically produce alternative transportation fuels, including oxygenated fuels, as well as co-generating electricity.

Finally, it would be advantageous to co-produce value-added petroleum substitutes and chemical feedstocks by refining coal and utilizing the hot process carbon (char) with process water to produce methanol and fuel to spin turbines.

Thus, it would be highly advantageous to have a co-generating system which would produce electricity while utilizing the process heat in the production of petroleum substitutes and oxygenated fuels from coal using no external water, preferably in a combined cycle configuration.

SUMMARY OF THE INVENTION

The instant invention relates to an improved method for refining various ranks of coal and lignite by short residence time ("SRT") hydrodisproportionation ("HDP") to produce a high liquid hydrocarbon yield with subsequent gasification of at least a part of the particulate char to produce methanol and electric power in an economical co-production and co-generation scheme wherein valuable hydrocarbon liquids are removed from the coal prior to producing methanol and electric power from the hot char and process water. The co-generation system of the instant invention revolves around the very efficient and versatile HDP process which produces coal char, a liquid organic material, and a hydrocarbon-containing gas. The char is a uniform, high Btu, solid fuel while the volatile organic material, depending on HDP reactor conditions, is predominantly a stable liquid hydrocarbon. The gases after purification are available as a high quality fuel for electrical co-generation or for feedstock or for further refinement.

It has now been discovered that coal can be processed at shorter residence times, lower pressures, higher volatilization temperatures to effect higher heating rates without attendant gas production and/or "condensation" reactions, thereby producing high hydrocarbon liquid yields and particulate char. The char can be oxidized to yield sour syngas, consisting primarily of CO and $H_2$ with lesser amounts of $CO_2$, $H_2S$, $CH_4$, $NH_3$ and $N_2$, which is then combined with sour HDP gas consisting primarily of $H_2$, CO, $CO_2$, and $CH_4$ with lesser amounts of $H_2S$ and $N_2$, the combined gases are sweetened, then catalytically reacted to methanol in a "once-through" process. Purge gas from the once-through methanol is separated into a hydrogen-rich gas and a CO-$CH_4$-rich gas. The $H_2$-rich gas is recycled to the HDP reactor and the CO-$CH_4$ rich gas is used as fuel in the combined cycle co-generation configuration. High pressure steam generated in char gasification is used to generate power in the co-generation configuration and medium pressure extraction steam is used for process heat in the HDP process. In this manner, part of the $H_2$ inherently produced from char gasification is used to produce methanol; part of the $H_2$ is used to further upgrade liquid hydrocarbons produced in the HDP reactor; and $CH_4$ produced in the HDP reactor and high pressure steam from char gasification are used in the combined cycle co-generation unit.

In accordance with the HDP aspect of the invention, particles of volatile-containing carbonaceous material are heated at a rate effective to rapidly decompose and volatilize the solid, organic material. The decomposition reaction volatilizes the solid organic material into hydrocarbon fragments and free radicals, causing them to "exit" the carbonaceous particle. These volatilized, hydrocarbon fragments are intimately contacted with a hydrogen donor in a hydrogen-rich gaseous reducing atmosphere at a hydrogenation temperature effective to promote the "hydrogenation" of the fragments and free radical "hydrogen capping" and to inhibit condensation. Although some hydrocracking occurs (depending upon the hydrogenation temperature and pressure), the hydrogenation temperature and hydrogenation residence time are selected to reduce thermal hydrocracking and gasification. By rapidly heating the particles of carbonaceous material to a volatilization temperature to decompose the solid organic material and then hydrogenating at a hydrogenation temperature, stable, high quality hydrocarbon liquids are produced from internally generated hydrogen while gas production from both the "condensation" reaction and hydrocracking is minimized. Thus, high heating rates can be obtained to increase the decomposition reaction rate while hydrogenation temperatures are selected to effect efficient hydrogenation of decomposition products, without promoting attendant gasification and/or decomposition reactions.

In a preferred embodiment, at least a portion of the char produced by HDP is gasified to produce a fuel gas for the electric generating facility and the liquid organic material, likewise produced by HDP, is admixed with a portion of the char to produce a fluidic fuel or is used alone as a liquid fuel or feedstock, or is upgraded to transportation fuels such as gasoline or jet fuel. In one aspect, the fluidic fuel comprised of char and liquid organic material from the HDP process can be fired directly into liquid-fueled external or internal combustion devices. In another aspect, the fluidic fuel composition forms a transport medium wherein some to substantially all of the particulate char is separated from the liquid component and the char is used as a fuel for solid-fuel fired combustion devices. The hydrocarbon liquid from which the solid has been separated is used as a fuel for liquid-fuel fired combustion devices or as a feedstock.

In addition to the char and liquid hydrocarbons, the HDP process produces gaseous products. These gases contain combustibles, lower chain hydrocarbons, hydrogen, carbon monoxide, ammonia, sulfurous compounds, and nitrogenous compounds. The gases are useful for the extraction of marketable co-products such as ammonia, and for use as a hydrogen source for HDP, as a fuel for use in co-generation, and as a feedstock for the production of lower chain alcohols. Advantageously, the HDP gases are "sweetened" prior to being marketed or used in the process. The elimination of potential pollutants in this manner not only enhances the value of the char and liquid hydrocarbons as non-polluting fuels, but also improves the economics of the process as the gaseous products may be captured and marketed or utilized in the process. In accordance with a preferred embodiment, these gases are used primarily to produce lower chain alcohols.

In the broad aspect of the instant invention, the co-generation configuration comprises a power generating facility having at least one electric generating device and a process heat facility for thermal conversion of carbonaceous material to a particulate char, a liquid organic material, and a fuel gas, which process facility derives at least a portion of the process conversion heat from the waste heat produced in the generation of electrical power. In a preferred aspect, the electric generating device derives at least a portion of the generating heat from the gasification of hot char in which the combustible gases produced in said char gasification is fired to a combustion device for driving an electrical generator. In another aspect, the power generating facility includes an electric generating device, such as a steam turbine, which is powered by steam generated from the gasification of the char. In a preferred aspect, the electric generating facility comprises a device at least partially powered by gases derived during the HDP process and gases derived from the gasification of the char. Preferably, the electric power generating facility and the HDP process facility are located proximate the mine mouth and, more preferably, adjacent one another. In one aspect, the co-generation configuration is modular in nature, with the electric power generation facility being in the order of 100 to 300 MW and the HDP process facility being sized accordingly to maximize energy usage and economies of scale.

BEST MODE FOR CARRYING OUT THE INVENTION

Figure 1:
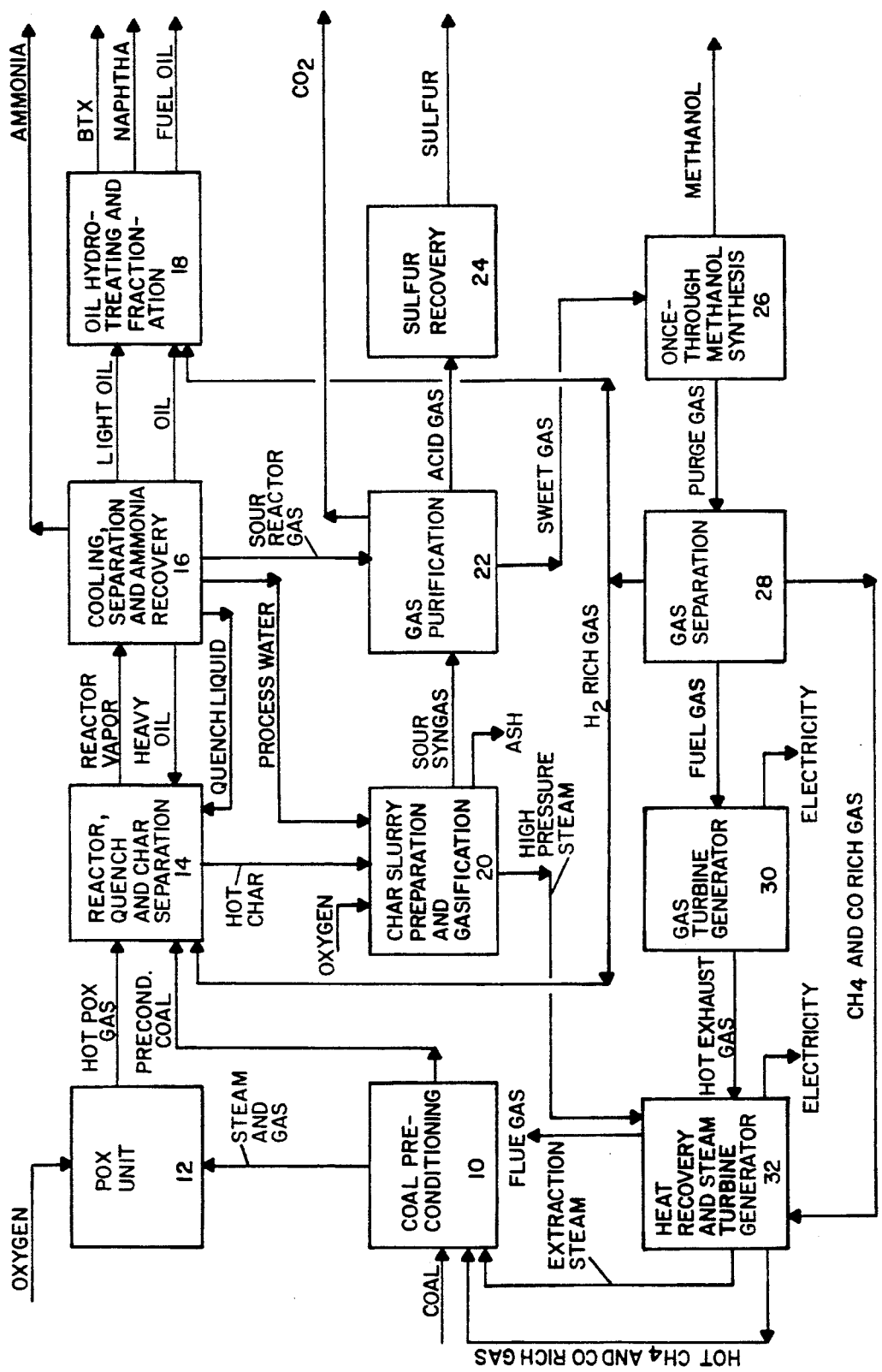
FIG. 1 is a flow sheet schematic for preparation of a coal-derived fuels, methanol, and electricity by a novel co-generation system where number blocks refer to unit process steps and/or facilities as contemplated by the practice of the instant invention. The facilities used in the practice of the preferred embodiment of the instant invention comprise the processing units and ancillaries required to produce methanol, the slate of petroleum substitute co-products, and electric power.

In accordance with the instant invention, electricity, methanol, and petroleum substitutes are produced efficiently by utilizing the process heat from coal hydrodisproportionation and char gasification and the "waste heat" associated with electrical power generation to provide and conserve energy in a novel, "symbiotic" relationship. In accordance with a preferred embodiment, the co-generation configuration is located proximate the mine mouth to effect further energy savings. In a further aspect, the electrical generating facility is of a modular nature and sized to effectively and efficiently utilize the cogenerated energy from the HDP facility, i.e., in the neighborhood of 100 to 300 MW as opposed to 400 MW to 500 MW which is the normal size for power generation. By advantageously reducing the capacity of the power plant and locating it at mine mouth proximate the HDP unit, the capital expenditure and operating costs can be reduced significantly. Thus, modular mine mouth stations and modular stations situated advantageously elsewhere on the "power grid" can fire the range of fuels produced by the co-generation facility of the instant invention. Since the rank of coal is not determinative in producing petroleum substitutes, methanol, and/or electricity, the mine mouth location may be in the lignite fields of Texas, the subbituminous fields of Wyoming or Montana, or the bituminous fields of Alaska, Kentucky or West Virginia.

The co-generation configuration of the instant invention comprises a conventional electrical power generating system containing at least one turbine for the generation of electrical energy and an HDP unit adapted for the production from coal of char, liquid organic material, and a hydrocarbon-rich gas wherein the "waste heat" from the electrical turbine step down is used as process heat for HDP; and/or the process heat generated by the HDP process is used for at least a part of the energy required to drive the electrical generating turbine; and/or the char is gasified to produce once-through methanol and low grade fuel gas for turbine peaking as well as additional hydrogen to upgrade the HDP process oil.

The electrical generating facilities which can be used in accordance with the instant invention are well known in the art. In a preferred embodiment, the power plant is of a combined cycle configuration. Specifically, a gas turbine cycle and a steam turbine cycle utilize a portion of the gases produced from the gasification of char and the hydrodisproportionation gases, with the a portion of both gases being converted to methanol in a once-through system. Steam generated from the hot gas turbine exhaust gases along with steam generated in the char gasification unit are used in a steam turbine. Preferably, part of the heat in the hot gas turbine exhaust gases is used to heat recycle gas and the step down heat from the steam cycle is then used to preheat and/or precondition the coal prior to the HDP step as further disclosed herein.

One embodiment of the instant invention utilizes a combined cycle generating system having at least one steam turbine and at least one gas turbine, wherein the steam turbine and the gas turbine each obtain at least part of the working gas heat from the combustible gases produced from gasification of char derived from hydrodisproportionation of coal. Steam generated from "waste heat" in the char gasification is used in a steam turbine. In one aspect, the hot exhaust gases from the gas turbine are used to preheat the combustible gases upstream of the gas turbine combustion chamber. Steam condensate from the steam turbine engine is flowed through a heat exchanger in the gas turbine exhaust heat recovery unit and returned to the steam turbine. The gas turbine exhaust heat recovery unit collaterally supplies heat to the hydrodisproportionation unit for high temperature conversion of the coal to combustible gases, char, and organic liquids.

This method of co-generation completely utilizes the heating value of the raw coal in powering a gas turbine as a result of the on-site combustion of combustible gases and in powering a steam turbine as a result of steam generated from gasification of char. The efficiency of the hydrodisproportionation unit is improved by transferring a portion of the heat from the working medium gases of one or both of the turbines to provide at least a portion of the HDP process heat for conversion of the coal into combustible gases, organic material, and char. The sub-stoichiometric combustion of char provides gas, in addition to heat, which is moved through the once-through methanol system to provide not only fuel gas for the gas turbine generator but also methane and CO-rich gas which is combusted in the POX unit to produce hydrogen.

The process of the instant invention as shown in FIG. 1 commences with coal feedstock supplied to a conventional coal grinding and preparation unit (not shown) where the coal is ground to preferably 70% minus 200 mesh and higher moisture coals are partially dried to less than 12% moisture by weight. The sized and partially dried coal is fed to a preheating and preconditioning unit 10 (optional) that preconditions and preheats the coal by direct contact with extraction steam and recycled gas from the heat recovery and steam turbine generator unit 32.

The preconditioned coal is moved to the HDP reactor unit 14 where it is contacted with hot hydrogen-rich gas, preferably from a partial oxidation unit 12, and where the coal is hydrodisproportionated to produce char, organic material, and a hydrocarbon-containing gas. The char is a uniform, high Btu, solid fuel, while the volatile, organic material is predominantly a stable liquid hydrocarbon. The gases, after purification, are a high quality fuel.

The hot char produced at 700° F. to 1,000° F. is separated from the HDP vapors and is sent to char slurry preparation and gasification unit 20 where it is first slurried with process water recovered in unit 16 and then gasified (as later more fully described) to produce a sour syngas consisting primarily of CO and $H_2$; with lesser amounts of $CO_2$, $H_2S$, $CH_4$, $NH_3$, and $H_2$. The hot sour syngas is cooled to generate high pressure steam and is then sent to gas purification unit 22. The high pressure steam is sent to a turbine generator in unit 32.

The hot stabilized vapors from unit 14 are cooled in a series of heat exchangers to recover heat and scrubbed to remove residual char dust in cooling and separation unit 16. The heavy condensed oil (primarily 700° F. plus boiling hydrocarbons) is separated and recycled to unit 14. The collected light oil, which is rich in benzene, is sent to oil hydrotreating and fractionation unit 18 where it is hydrotreated. BTX is then separated from naphtha range hydrocarbons (less than 380° F. boiling hydrocarbons) by extractive distillation and sent to storage (not shown). Collected, middle range boiling oil from unit 16 is also sent to oil hydrotreating and fractionation unit 18. The oil is hydrotreated to reduce sulfur and nitrogen content and increase hydrogen content. The hydrotreated oil is fractionated to recover naphtha range hydrocarbons and low sulfur fuel oil.

The collected water in unit 16 is stripped in a water stripper to remove dissolved gases and ammonia. Anhydrous ammonia is then recovered as a co-product and sent to storage (not shown). The stripped process water containing dissolved organic material is conveyed to unit 20 to slurry the char for injection into the char gasifier unit. The dissolved organics in the water are gasified in the char gasifier to produce additional CO and $H_2$ (as described later). Thus, advantageously, no water effluent is discharged from the facility, making expensive, water clean-up facilities unnecessary.

The non-condensed cooled sour gas from cooling and separation unit 16, which has been scrubbed to remove char dust, is conveyed to gas purification unit 22 and combined with the sour syngas produced in char gasification unit 20. In unit 22, sulfur compounds, trace impurities and most of the carbon dioxide are removed from the sour gas. The removed sulfur components are sent to a sulfur recovery unit 24 where the sulfur is recovered by conventional means as a co-product and sent to storage (not shown). The separated $CO_2$ is compressed by conventional means to about 2,000 psia and removed by pipeline (not shown) as a co-product for use in enhanced oil recovery, agriculture, and the food industry.

The purified gas is moved from unit 22 to a oncethrough methanol synthesis unit 26 where part of the $H_2$ and CO in the gas stream are catalytically reacted to produce methanol. The effluent stream from the methanol reactor is cooled to condense the produced methanol. The methanol is separated from the unreacted gases, purified, and sent to storage (not shown). The unreacted gases are purged from the methanol synthesis unit and moved to gas separation unit 28 where they are separated into a hydrogen rich gas stream and a methane/carbon monoxide rich gas stream. Most of the hydrogen rich gas is compressed and recycled to the HDP reactor in unit 14 and the remainder of the hydrogen rich gas is sent to oil hydrotreating and fractionation unit 18. Thus, advantageously, part of the hydrogen generated from char gasification is used to produce methanol, and part of the hydrogen is used to hydrogenate the oil produced in flash volatilization of coal. Part of the separated methane/carbon monoxide rich gas is compressed, heated in unit 32, and recycled to coal preconditioning unit 10. The remainder of the methane/carbon monoxide rich gas is moved to a gas turbine generator unit 30. The methane/carbon monoxide rich gas is used as fuel gas in a gas turbine that generates electric power. Thus, part of the methane produced in the flash volatilization of coal is used as fuel in the gas turbine generator. Hot exhaust gas from the gas turbine is moved to heat recovery and steam turbine generator unit 32. The hot flue gas from unit 32 is cooled to recover heat, i.e., generate and superheat high and medium pressure steam and to preheat boiler feed water. The superheated high pressure steam is moved to a steam turbine generator that generates electric power. Part of the superheated medium pressure steam is extracted from the steam cycle and sent to the coal preconditioning unit 10 where it is used to preheat and precondition the feed coal. The remainder of the superheated medium pressure steam is used in a medium pressure steam turbine generator to produce additional electric power.

FEEDSTOCK PREPARATION

Feedstock preparation includes receiving, storage, reclaiming, conveying, grinding and drying facilities required to prepare the coal or lignite for introduction to the preconditioning unit 10. Coal preparation includes facilities to grind or pulverize the feedstock from a received size of 5 cm to 70 percent minus 200 mesh and to dry the coal to from about 1% to 12% by weight moisture and preferably 2% to about 4% by weight moisture.

The crushing, pulverizing and/or grinding can be accomplished with any equipment known in the art, but preferably is accomplished with impact mills such as counter-rotating cage mills, hammer mills or the like. The pulverizers are swept with a stream of heated gas which partially dries the coal. Pulverizer outlet temperature is maintained at from about 100° to about 500° F. and preferably from 150° F. to about 400° F.

The pulverized coal is pneumatically conveyed to a set of cyclones located in coal preconditioner unit 10. Part of the gas from these cyclones is returned to the pulverizer circuits and the remainder of the gas is sent to a bag house prior to being vented to the atmosphere. Fugitive dust collectors are provided at transfer points to minimize coal dust emissions to the atmosphere. Advantageously, carbonaceous fines and the like are subjected directly to hydrodisproportionation.

COAL PRECONDITIONING

Unit 10 of FIG. 1 includes coal pre-conditioning with steam and methane/carbon monoxide ($CH_4$/CO) rich gas. This step is optional in the practice of the invention. Pneumatically conveyed coal from the coal grinding unit (not shown), is fed to a cyclone separator to separate the coal from the transport gas. Most of the transport gas is recycled back to the coal grinding unit (not shown). A slip-stream is diverted to a bag filter to remove entrained coal dust prior to exhausting to the atmosphere. The coal from the cyclone separators and bag filter is sent to a coal feed surge bin. The coal is normally fed through lockhoppers which are pressurized with high pressure nitrogen from the air separation plant. After an upper lockhopper is filled with coal, it is then pressurized prior to its discharging coal to the lower lockhopper. The emptied upper coal lockhopper is then depressurized to atmospheric pressure and is again filled with coal from the surge bin. Lockhopper valves are controlled, for example, by a microprocessor unit which is used to control the coal filling, pressurization, coal feeding and depressurization sequence.

The coal preconditioning unit 10 is preferably a fluidized bed vessel in which coal from the lockhoppers is contacted with $CH_4$/CO rich recycle gas and steam at from about 500 psig to about 2,000 psig, and preferably from about 600 psig to about 1,500 psig, at a temperature from about 600° F. to about 1,050°, preferably about 800° F. to about 1,000° F., and more preferably about 950° F. The coal is contacted with the heated gas and steam to provide mixed coal and gas temperatures at a temperature between about 350° F. and about 650° F. The exact temperature will depend upon the coal. Coking and agglomerating coals are especially sensitive to mixing temperatures. The residence time of the coal in the pre-conditioner varies from about 30 seconds to 3 minutes, preferably about 2 minutes, depending on the desired temperature, coal particle size distribution, rank of coal, and throughput rate. The velocity of the steam is preferably adjusted to suspend the coal particles in the steam (fluidized bed). The superheated steam and gas preheat and precondition the coal prior to the coal being fed to the SRT-HDP reactor within unit 14. Steam, gas, and entrained coal from the fluidized bed preconditioner is fed to a separator (for example, an internal cyclone) where the coal is separated and returned to the fluidized bed while the resultant steam and gas stream containing entrained hydrocarbons from the separator is sent to a POX reactor unit 12. These entrained gases have value as fuel in the POX reactor or as a hydrogen source in the SRT-HDP reactor in unit 14. The preconditioned coal from the preconditioner is moved to the HDP reactor. Advantageously, the preconditioning is carried out using heat recovered from the gas turbine hot exhaust gas.

Neither the preconditioning steam nor the entrained hydrocarbons are emitted into the air but, in fact, are used in the POX unit 12. The entrained hydrocarbons are used as a fuel source in the partial oxidation reactor to increase heat and produce hydrogen, CO and the like. Preconditioning is optional depending upon the desire for increased liquid yield of a particular rank of coal versus the capital and operating costs of the preconditioning unit.

PARTIAL OXIDATION UNIT

Referring to FIG. 1, the partial oxidation (POX) reactor unit 12 comprises any pressurized partial oxidation reactor capable of producing hydrogen donor-rich gas ($H_2$ and CO) and generating gas temperatures in excess of about 1,300° F. This process produces hydrogen, high quality heat and a reducing atmosphere (CO) for the hydrodisproportionation reaction, as well as the production of hydrogen for downstream hydrotreating and for reducing sulfur and nitrogen. The POX process may be combined as a first stage of the unit 14 reactor or, preferably, may be accomplished in a separate unit as shown in FIG. 1. In the POX unit, methane/carbon monoxide-rich gas, preferably reaction gas discussed hereinbelow, and steam are sub-stoichiometrically reacted with oxygen to produce a hydrogen-rich gas, CO, and high quality heat. The hydrogen-rich gas, the CO and unreacted steam from the POX reactor are at a high temperature and provide the required heat and reducing atmosphere necessary for hydrodisproportionating the coal.

More specifically, in the present process, a fuel gas, preferably a CO-rich methane, and more preferably a purified reaction gas, is introduced into a reactor with oxygen. The oxygen is present in an amount less than the stoichiometric amount required to react with all of the fuel gas. An amount of steam sufficient to preferentially inhibit the production of water is also introduced. The steam is preferably derived from preconditioning the coal. The CO in the gas stream is preferred for the selective production of hydrogen by extraction of an oxygen from water. This occurs in accordance with one or more of the following reactions:

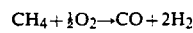

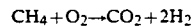

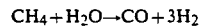

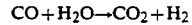

Generally, the oxygen is introduced into the POX reactor in an amount to provide a molar ratio of oxygen to $CH_4$/Co within a range from about 0.3 to about 1.25 and preferably from about 0.40 to about 0.90, and more preferably from about 0.5 to about 0.75 based on a methane-to-CO volumetric ratio of 1 to 1. These ratios will change depending upon the requirement for the heat generated and the composition of the exit gas, specifically the required partial pressure of $H_2$.

The oxygen, fuel gas and steam are reacted in the POX reactor at a pressure of from about 500 psig to about 2,000 psig and preferably from about 700 psig to about 1,500 psig and at a temperature within the range from about 1,300° F. to 3,000° F., and preferably from about 1,500° F. to 2,500° F., and more preferably from about 1,800° F. to about 2,300° F.

The POX reaction produces a hot gas stream principally comprising hydrogen, CO and steam along with carbon dioxide and minor amounts of other gases such as nitrogen or the like. The temperature of the POX reaction is controlled such that the hot gas stream produced is essentially free (for example, totaling less than 0.1 volume percent of the total gas stream) of hydrocarbons, oxygen moities and hydroxyl moities, although there can be a small amount of methane, depending on the conditions. The hot gas stream is preferably mixed with recycle hydrogen from the gas separation unit 28 (described hereinbelow) which has been heated to about 1,000° F. The resulting gaseous mixture, having a uniform temperature, is then injected into the HDP reactor.

HDP REACTOR, QUENCH, AND CHAR SEPARATOR

HDP Reaction

Coal from the preconditioner unit 10 is fed to the reactor, char separation and quench u it 14 by gravity and differential pressure. The coal is preferably injected into the reactor through a central feed nozzle where it is rapidly heated by contact with hot gas from the POX unit to effect disproportionation at a thermal equilibrium mix temperature of from about 1,000° F. to about 2,000° F., and preferably at about 1,500° F. to 1,750° F. for bituminous coals and 1,300° F. to 1,500° F. for sub-bituminous and lignites and at reactor pressures from about 500 psig to about 2,000 psig, and preferably from 600 psig to 1,500 psig. The hot POX gas rapidly heats the coal at a rate of at least about 10,000° F./second and at ranges from about 10,000° F./second to about 250,000° F./second.

Prior to contacting the coal, the hot gas from the POX unit has been accelerated to a velocity to effect intimate contact of the particulate coal with the hot gas stream and to volatilize the coal within a residence time in the reactor of from about 2 milliseconds to about 100 milliseconds, and preferably from about 10 milliseconds to about 75 milliseconds, and more preferably from about 15 milliseconds to about 50 milliseconds, depending on the rank of the coal. The hot gas is accelerated to velocities in the range of from about 200 feet per second to about 1,000 feet per second, and preferably from about 300 feet per second to 800 feet per second, and most preferably from about 400 feet per second to 600 feet per second to effect mixing of solid and gas.

In the prior art, oxygen is injected into the downstream volatilization reactor to provide heat. This method used up valuable hydrogen. The only oxygen present in the volatilization reaction of the instant invention is from oxygen in the coal molecule. The important aspect is that there is no "free" oxygen in the feed to the HDP reactor so that water formation is not the preferential reaction.

The amount of particulate coal and the amount of hot gas introduced into the HDP reactor can be controlled to produce the desired reaction temperature and residence time. The higher the partial pressures of hydrogen, CO, and steam in the HDP reactor, the more saturated hydrocarbons and $CO_2$ are produced. The reactants and products from the HDP process are rapidly cooled to effect the desired total hydrodisproportionation reaction exposure time.

The POX and HDP reactions may be accomplished in two separate reactors or within a single vessel. In this latter configuration, the carbonaceous feed is introduced into the hot, hydrogen donor-rich gas generated in a first stage to provide heat and reactants to effect the downstream second stage. The direction of product movement through the first and second stages is not limited to either upflow or downflow when a high velocity propelling force is used to overcome gravitational forces and to insure proper heating profiles and rapid product movement through the reactors. The direction of flow of the products through the reactors or vessel is dependent only upon the longitudinal axial alignment of the reactors or single reactor vessel. By using high velocity flows to propel the reaction products through the reactors, the direction of axial alignment of the reactors or vessel can be varied. However, the direction of axial alignment of the reactor is not important since high velocity entrained flow is not gravity dependent so long as the high rate of flow and short exposure time required to achieve the desired product slate is provided.

Preferably, the POX reaction of the process is accomplished in a separate unit. In this method, the outlet end of a POX reactor section is connected in close proximity to the inlet end of a reaction section designed to accomplish the disproportionation reaction. The two reactor sections can comprise two physically separate, compatible reactors utilizing a high product flow rate, short-residence time, entrained-flow reactor; or the two reaction stages may be integral parts or zones of a single unit.

This two-stage process can be used for the reaction of any solid or semi-solid or even liquid carbonaceous material. Preferably, oxygen is introduced to the POX unit 12 in sub-stoichiometric amounts to maintain the desired operating temperature range in the second-stage hydrodisproportionation. Steam is added to effect material balance, to enhance the phase shift reaction, and to inhibit the production of water. The amounts are empirical to the feedstock and desired product slate. Steam requirements are therefore dependent upon the second-stage carbonaceous material feed rate, the type of carbonaceous feed introduced, and the operating conditions in the second stage, etc.

Higher temperatures and longer residence times in the second stage create a need for greater amounts of hydrogen in the second stage as heavy hydrocarbons are cracked to lighter material. In order to meet second-stage hydrogen requirements, for example, 0.05 to 0.25 pounds of $H_2$ per 1 pound of carbonaceous material is required to be fed into the second stage.

The instant process, which involves the rearranging of hydrogen and the use of hydrogen from constituents in the carbonaceous material, has certain limits Specifically, the amount of hydrogen that can be produced in this manner is finite. It has been found, however, that with most coals other than anthracite, devolatilization of the coal, cracking of heavier material, and even hydrogenation of some portion of the solid carbon is possible. Of course, the more hydrogen in the feedstock, the more valuable is the fuel produced.

A refractory-lined reactor vessel can be used to volatilize the carbonaceous material. This vessel can be a single vessel for the combined stage-one and stage-two processes, or for the stage-two process only. The second-stage vessel can be cylindrical or rectangular in shape.

As part of the unit 14 reactor configuration, an injector system is preferably used for rapidly injecting the particulate coal and rapidly admixing and heating the coal with a hot, hydrogen-rich stream of reducing gases. The coal injector can be centrally located or can comprise a series of manifolded injectors dispersed on the head portion of the reactor. The carbonaceous material and hot gas are preferably injected through rectangular shaped slots with the hot gas stream injection angle not greater than 60 degrees when measured from a horizontal plane. The means for particle injection can be any means known in the art, such as gravitational flow, differential pressure, entrained flow, or the like.

Figure 2:
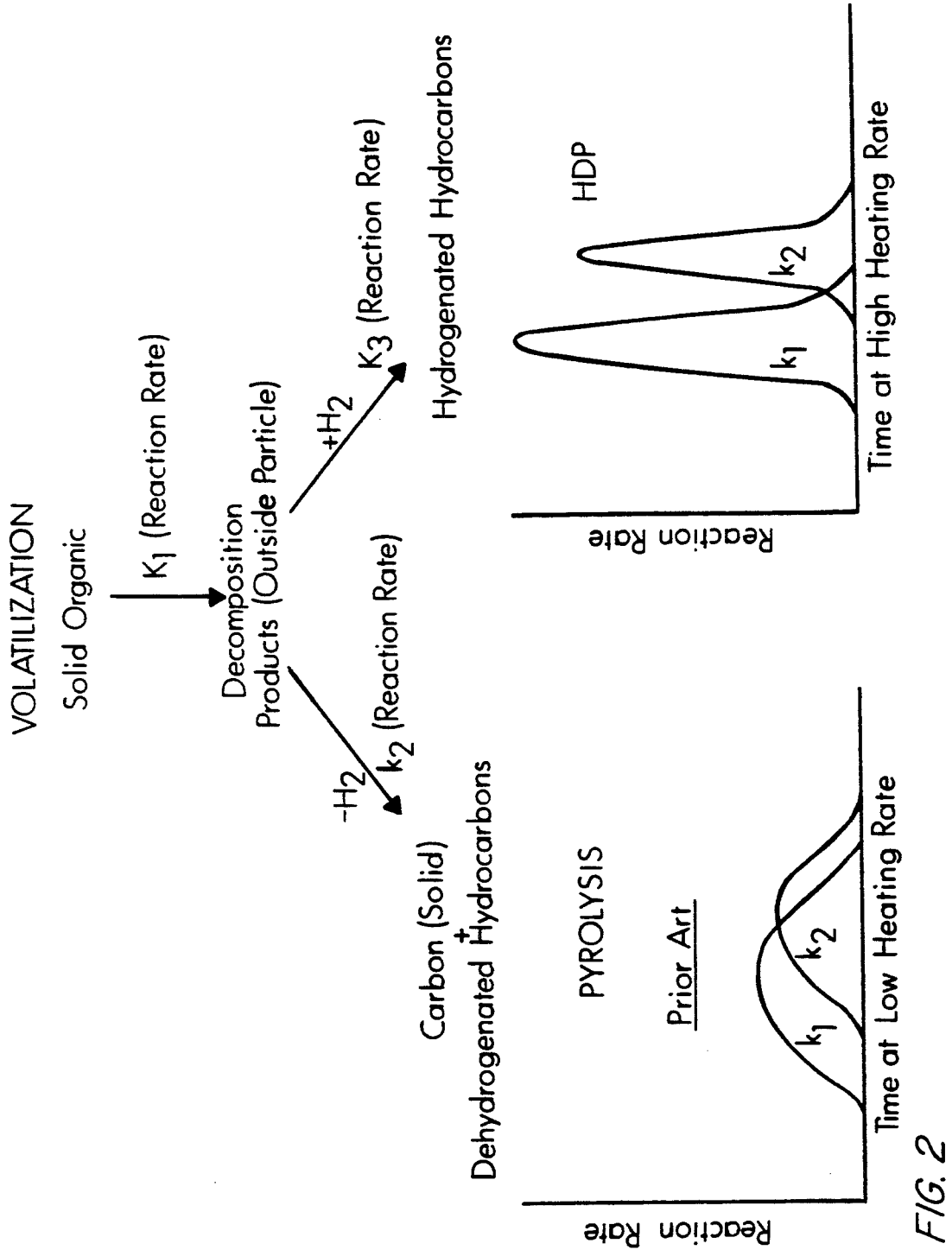
FIG. 2 is a depiction of the reaction rates and reactions associated with the prior art pyrolysis as well as those associated with the HDP reactions of the present invention.

FIG. 2 shows the distinction between the HDP process of the instant invention and the prior art pyrolysis process. The following is advanced as explanatory theory only and should not be construed as a limitation of the instant invention. The rapid volatilization and decomposition of volatile-containing carbonaceous material is accomplished by heating the carbonaceous material very rapidly to effect a high heating rate (second order function) to a volatilization temperature. This heating rate has been found to increase $k_1$ and minimize the "condensation" reaction rate $k_2$. When decomposition is accomplished at higher heating rates, i.e., in excess of 10,000° F./second, the decomposed volatilized material is "blown out" of the particle as low molecular weight hydrocarbons which contain free radical sites. If hydrogen is present in the atmosphere surrounding this decomposed material as it exits the particle, the decomposed material is hydrogenated. If the condensation reaction is allowed to proceed at lower heating rates, then the volatile material remains trapped in the coal particle and the presence of hydrogen in the atmosphere is not as effective.

However, in order to effect high heating rates, the mixing temperature must be relatively high to impart sufficient energy to the coal particle to heat it rapidly in milliseconds of time. These high mixing temperatures, however, dilitariously affect the formation of hydrogenated liquids and promote cracking to gaseous products which use up hydrogen and degrade liquid production.

By immediately adjusting the temperature of the decomposed volatilized material to a hydrogenation temperature (as opposed to stopping the reaction by "stabilization quenching") in the presence of hydrogen, $k_3$ is increased such that hydrogenated, light liquids are produced. Therefore, as is shown in FIG. 2, the concentration of decomposition material available to undergo the "condensation" reaction with reaction constant $k_2$ is minimized. Adjustment of temperature to a hydrogenation temperature also minimizes high temperature thermocracking to gases heretofore believed a necessary product of high heating rate volatilization processes. Hydrogenation temperatures in the order of from about 900° F. to about 1,500° F., and preferably from 1,000° F. to 1,300° F. at residence times of from about 0.1 seconds to about 5.0 seconds are required, depending on the type of coal processes and desired product slate.

The hydrogenated products may be further quenched to cease all reactions after the decomposition products have been sufficiently hydrogenated. Thus, in accordance with the instant invention, the initial heating rate of the coal does not have to determine the ultimate slate of volatilization products, including large amounts of gas, and the condensation reaction can be effectively avoided.

QUENCH

Within the reactor, quench, and char separator unit 14 are located one or more sets of quench nozzles. Preferably, anterior of the reactor vessel, disposed in an annular fashion about the circumference of the vessel, are one or more sets of quench nozzles through which a quench medium is dispensed to slow down and/or terminate the HDP reaction and to reduce the temperature of the reaction products. The temperature reduction is preferably accomplished in a single or series of quench steps. Hydrogen rich gas is a preferred quench medium. Heavy process oils which undergo hydrocracking during the quench are greatly preferred.

The HDP vapor is subjected to an instant quench to stop the volatilization reaction and provide a direct heat exchange. This may take place in two or more steps which may be overlapping. In a particularly preferred embodiment, a two-step quench is used to minimize the condensation reaction, i.e., formation of high viscosity tars and/or the formation of gas. In the first step, the heavy oil produced in the HDP reaction is recycled as a primary quench medium. This quench medium is injected directly through a first set of quench nozzles to effect a temperature reduction to hydrogenation temperatures, as well as a "thermal cracking" of the heavy oil and tars. In a preferred embodiment, a recycled hydrogen donor-rich gas is used as an additional initial quench medium.

The second quench step, when two or more quenches are used, employs recycle water and lighter oils or indirect heat exchange to reduce the temperature of the HDP volatiles to a stabilization temperature below about 900° F., preferably from about 700° F. to about 900° F., to prevent reaction (polymerization) of unsaturated hydrocarbons and free radicals and to inhibit further "thermal cracking" to gas.

The quantity of quench liquid is determined by its latent heat of vaporization and heat capacity or ability to absorb the sensible heat of the HDP vapors. The quench liquid can comprise any liquids or gases that can be blended rapidly and in sufficient quantity with the reactant mixture to readily cool the mixture below the effective reaction temperature. The cooling down or quenching of the reactant HDP vapors can occur within the HDP reactor or in the pipe line between the HDP reactor and char separator by quench nozzles located in the pipe line.

The short residence time in the HDP reactor is conducive to the formation of aromatic liquids and light oils. It has been found that rapid heating of carbonaceous materials not only "drives out" the volatiles from the feed particles (devolatilization), but also thermally cracks larger hydrocarbons, allowing volatiles to escape from the host particle so rapidly that condensate reactions are largely bypassed. With a rapid quench to hydrogenation temperatures, these volatiles are stabilized first by reaction with hydrogen to form a less reactive product and then by lowering the internal energy of the volatiles below the reactive energy level. The net result is the rapid production of these volatiles to prevent polymerization to heavy oil or tar (high molecular weight compounds) and the maximization of lighter hydrocarbon liquids.

REACTOR PRODUCTS

The HDP reactor product slate includes primarily $H_2$, $CO$, $CO_2$, $H_2S$, $NH_3$, $H_2O$, $C_1$ to $C_4$ hydrocarbons, benzene, toluene, and xylene, light and medium oils, (minus 700° F. boiling liquids), and heavy oils (plus 700° F. boiling liquids). The product slate is dependent upon the coal type and operating parameters, such as pressure, temperature, and second-stage residence time, which can be varied within the reactor system. It has been found that the presence of $CO$, $CO_2$, and $CH_4$ in the feed to the HDP reactor does not inhibit the production of benzene, toluene, xylene (BTX) and other liquid products in a short residence time, high-temperature hydropyrolysis. Carbon dioxide is merely a diluent which has little effect on the second-stage reactions. It has been found that $CH_4$ in the feed to the HDP reactor can inhibit $CH_4$ production in the reactor and thereby increase oil yield and conserve hydrogen. The presence of steam inhibits the formation of water ($H_2 + \frac{1}{2} O_2 \rightarrow H_2O$) and the net reaction extracts hydrogen from water to provide some of the hydrogen consumed in the hydrogenation reactions.

The total carbon conversion, expressed as the percentage of the carbon in the gases and liquids found in the HDP products to the total amount of carbon in the carbonaceous feed material ranges from about 40 weight percent to about 70 weight percent. The component carbon conversion, expressed as the percentage of carbon converted to that product to the amount of carbon in the carbonaceous feed material, ranges as follows: $C_1$–$C_4$ hydrocarbons from about 2 weight percent to about 10 weight percent; BTX from about 1 weight percent to about 20 weight percent; minus 700° F. boiling liquids (excluding BTX) from about 20 weight percent to about 50 weight percent; and plus 700° F. boiling liquids from about 10 weight percent to about 30 weight percent.

The HDP product gases are useful in producing methanol and fuel gas and for the extraction of marketable by-products such as ammonia and they serve as a hydrogen source for hydrotreating the product oil to produce transportation fuels, fuel oil, etc. Use of these gases in this manner improves the economics of the HDP process as well as the total efficiency of the cogeneration configuration.

CHAR SEPARATION

The quenched HDP vapor and char are sent to a primary char separation apparatus within unit 14 where most of the char is separated from the vapor. The vapor stream is then sent to a secondary separator to remove additional char. The vapor, now containing only a small amount of char dust, is then conveyed to cooling, separation and ammonia recovery unit 16. The hot, dry char is collected at separator pressure and moved to unit 20.

COOLING, SEPARATION AND AMMONIA RECOVERY

The char dust is scrubbed from the quenched, stabilized HDP vapor and the vapor is cooled and condensed in cooling, separation, and ammonia recovery unit 16. The stabilized vapor, which has been hydrogenated and quenched to a temperature of from about 700° F. to about 1,000° F. and preferably to about 850° F., is cooled in four consecutive steps. Liquid hydrocarbons and water are also condensed and collected for separation in an oil-water separator within unit 16. Facilities in unit 16 scrub the ammonia from the remaining noncondensible sour gas to less than 10 ppm before the sour gas sent to gas purification and separation unit 18. Facilities in unit 16 also strip and recover anhydrous ammonia as a by-product.

Within unit 16, a first cooling step is accomplished. In this step, the vapor at about 850° F. entering from unit 14 is cooled to about 520° F. in a heat exchanger where saturated steam is generated. This partially cooled vapor stream is sent to a scrubber and then to a vapor-liquid separator where condensed heavy hydrocarbons are separated from the cooled vapor stream. Part of the condensed liquid from the bottom of the separator is recirculated to the scrubber where it contacts the partially cooled vapor stream to remove residual entrained char dust from the vapor. The remainder of the condensed heavy hydrocarbon material is recycled to unit 14 to act as the first HDP quench fluid as previously described.

In a second cooling step, the vapor which has been cooled in the first step to about 520° F. is circulated through a second heat exchanger where it is cooled to about 300° F. by generating lower temperature saturated steam. This cooled stream is moved to a second separator where condensed oil and water are separated from the vapor stream.

The remaining cooled vapor stream from this second separator is circulated through a third heat exchanger in a third cooling step where it is further cooled by preheating boiler feed water to about 290° F., creating a liquid-vapor stream. The cooled liquid-vapor stream then goes to a third separator for separation of the liquid (oil and water) from the vapor.

In a fourth cooling step, vapor from the third separator is sent to an air cooler where it is cooled to about 145° F. with air and then cooled to about 100° F. by a water cooled exchanger. This cooled vapor-liquid stream goes to a fourth separator (bottom section of the ammonia scrubber) where the light condensed oil and water are separated. The remaining vapor then proceeds to a packed bed section in the ammonia scrubber where it is contacted with water to remove any remaining ammonia and acid gas and is sent to gas purification unit 28. The remaining material comprises a condensed light oil and water.

The oil-water stream from the second separator is cooled and admixed with oil from the third separator. The admixture is sent to an expansion drum within unit 16 wherein the pressure is reduced and where most of the dissolved gases in the oil-water mixture are released to flare (not shown). The de-gassed oil-water mixture is sent to an oil-water separator within unit 16 where the oil is separated from the water. The oil (400° F. + boiling hydrocarbons) is sent to unit 18. Water from the bottom of the oil-water separator is sent to an ammonia stripper and recovery facility.

The light oil-water stream from the fourth separator is sent to a light oil expansion drum within unit 16. The gas released in the expansion drum is mixed with the gas from the heavy oil expansion drum and then cooled to 100° F. in a water cooled heat exchanger prior to being flared. The light oil-water mixture from the expansion drum is sent to a separator where the light oil is separated from the water. Separated light oil, consisting primarily of aromatic naphtha, is sent to unit 18. Water from the bottom of the oil-water separators is stripped to remove ammonia and sulfur-containing acid gas.

The stripped ammonia and sulfur-containing acid gas are sent to an ammonia absorber where the ammonia is selectively separated from the acid gas, utilizing, for example, a lean ammonium phosphate solution as the solvent. The acid gas from the absorber overhead is sent to the sulfur recovery unit 30, which may be, for example, a Claus unit. The anhydrous ammonia, after separation from the water, is condensed and pumped to storage (not shown). The stripped water containing dissolved organic material is moved to char slurry preparation and gasification unit 20.

OIL HYDROTREATING AND FRACTIONATION

Unit 18 represents a facility to hydrotreat, hydrodesulfurize, and hydrodenitrofy light oil (aromatic naphtha) naphtha and heavier oil produced in the hydrodisproportionation of coal. This process renders these co-products substantially non-polluting, i.e., containing little, if any, $SO_x$ or fuel $NO_x$. This unit area is divided into two sections: an aromatic naphtha hydrotreating section and an oil hydrotreating/fractionation section.

The aromatic naphtha hydrotreating section hydrogenates non-aromatic naphtha boiling range hydrocarbons and desulfurizes and denitrifies the aromatic naphtha to less than 1 ppm and 0.1 ppm, respectively. The aromatics (primarily benzene with lesser amounts of toluene and xylene) are separated from non-aromatic naphtha hydrocarbons by extractive distillation and sent to storage. These products are useful as gasoline blending stock and/or chemical feedstock.

The oil hydrotreating section hydrotreats and stabilizes the oil such that it will not polymerize, and desulfurizes the oil to less than 0.15 percent sulfur. The oil hydrotreater also reduces nitrogen to less than 2,000 ppm and oxygen to less than 100 ppm. The hydrotreated oil can be used as a high quality fuel oil or as an oil refinery feedstock. Processes for hydrotreating liquid hydrocarbons are commercially available.

In another embodiment, the oil can be hydrotreated, hydrocracked, and reformed to produce gasoline and jet fuel. Processes for hydrotreating, hydrocracking, and reforming liquid hydrocarbons are well known, a number of such technologies being readily available.

CHAR/WATER SLURRY PREPARATION AND GASIFICATION

Hot char from the char separation unit 14 at pressures from about 500 psig to about 2,000 psig is slurried with process water collected in unit 16. The char slurry is preferably gasified in an entrained flow gasifier (such as Texaco gasifiers) at a temperature above the ash slagging temperature, for example, temperatures in the range of about 2,300° F. to about 2,800° F. The sour syngas product from char gasification, containing primarily CO, $H_2$, and steam with lesser amounts of $CO_2$, $H_2S$, $NH_3$, and $CH_4$, is sent to gas purification unit 22.

GAS PURIFICATION

All of the gas handling facilities required for gas purification are contained within unit 22. Sour gas from the cooling and separation unit 16 and sour syngas produced in unit 20 are sent to gas purification where sulfur components are removed to less than 0.2 ppm and carbon dioxide is reduced to less than 3.0 percent. Trace quantities of ammonia and hydrogen cyanide are also removed from the gas. An example of such a commercially available gas purification unit is the "Rectisol" process licensed by Lurgi, Frankfurt, West Germany.

A compressor for carbon dioxide is included in unit 22. $CO_2$ off-gas separated from the sour gas is sent, for example, to a two case, electric motor driven, centrifugal compressor where the $CO_2$ is compressed in 4 stages with interstage air coolers followed by water cooled exchangers. An air after-cooler followed by a water cooler is also provided to cool the compressed (fluid) $CO_2$ to about 100° F. prior to being sent to a pipeline.

Sour gas from cooling and separation unit 16 is cooled by cool purified gas and refrigerant to condense residual water vapor in the gas. The condensed water is separated from the gas and sent to water treating unit (not shown).

The cooled gas is then sent to an $H_2S$ absorber. The gas is contacted with a solvent in the bottom of the $H_2S$ absorber to remove naphtha boiling range hydrocarbons plus residual water, ammonia, and hydrogen cyanide. The gas then flows to the main $H_2S$ absorber section where $H_2S$ and COS are removed by cold $CO_2$-laden solvent.

The desulfurized gas then goes to a $CO_2$ absorber where most of the $CO_2$ is removed from the gas by cold regenerated solvent. The cold, purified gas is heated by cross-exchange with the incoming sour gas prior to being sent to once-through methanol synthesis and purification unit 26.

The solvent containing $H_2S$, COS and $CO_2$ from the $H_2S$ absorber is flashed to release dissolved gases ($H_2$, CO, $CH_4$, etc.). The solvent is further depressurized in a series of flashes to remove part of the dissolved $CO_2$. The enriched $H_2S$ solvent stream is sent to hot regeneration.

$CO_2$-rich solvent from the $CO_2$ absorber is flashed to release dissolved gases and is then further flashed to remove part of the dissolved $CO_2$. The partially regenerated solvent is recycled to the mid-section of the $CO_2$ absorber.

The released $CO_2$ from the $CO_2$ flash tower and from the $H_2S$ reabsorber are combined, heated and sent to the $CO_2$ compressor then to a $CO_2$ pipeline. $H_2S$-rich solvent from the $H_2S$ reabsorber is heated by cross exchange with hot regenerated solvent from the regenerator and then stripped in the hot regenerator to separate dissolved $H_2S$, COS, $CO_2$ and light hydrocarbons. The stripped gas is sent to sulfur recovery unit 24.

The solvent stream from the bottom of the $H_2S$ absorber containing naphtha and dissolved gases is flashed in a pre-wash flash tower. The flashed gases are recycled to the $H_2S$ reabsorber. The solvent-naphtha stream from the flash tower is sent to a naphtha extractor where the naphtha is separated from the solvent. The recovered raw naphtha is sent to oil hydrotreating and fractionation unit 18. The water-solvent stream from the extractor is sent to an azeotrope column. Residual naphtha, dissolved gases and some water and solvent are stripped in the overhead of the azeotrope column and recycled to the pre-wash flash tower. Water-solvent mixture from the bottom of the azeotrope column is pumped to the solvent-water column where the solvent is stripped from the water and sent to the regenerator. Waste water from the bottom of the solvent-water column is collected and sent to water treating unit (not shown).

METHANOL SYNTHESIS

The sweetened gas from gas purification unit 22 is moved to a once-through methanol synthesis unit 26 where part of the $H_2$ and CO are reacted at temperatures from about 430° F. to about 550° F., at pressures of from about 700 psig to about 2,000 psig, in the presence of a catalyst to produce primarily methanol with lesser amounts of water and other oxygenated compounds. The conversion catalyst can be any such material used in the art and specifically, copper-based catalysts normally used for methanol synthesis. The major reaction which occurs in the methanol synthesis unit is: $2H_2 + CO \rightarrow CH_3OH$. Commercially available processes such as Lurgi, ICI or Wentworth can be utilized to produce fuel grade methanol.

The effluent from the methanol reactor is cooled to condense the methanol produced. The condensed methanol is separated from the unreacted gases, purified, and sent to storage. The unreacted gases, rich in hydrogen, are purged from the methanol synthesis unit and sent to gas separation unit 28.

GAS SEPARATION

In the gas separation unit, hydrogen is separated from a $CH_4$/CO-rich gas by, for example, a membrane separator. In the membrane separator, $H_2$ is separated from the other gases by semipermeable membranes formed, for example, into hollow fibers. The separated hydrogen (containing small amounts of $CO_2$, CO, and $CH_4$) is compressed in a hydrogen compressor. Most of the compressed, hydrogen-rich gas is then recycled to unit 14 where it is used to partially hydrogenate the liquid HDP product. The remainder of the hydrogen-rich gas is sent to oil hydrotreating and fractionation unit 18. Part of the separated gas (primarily $CH_4$ and CO) is heated in unit 32 and sent to the preconditioning unit 10. The remainder of the $CH_4$/CO-rich gas is sent to the gas turbine generator unit 30. Other processes for gas separation, such as cryogenic separation, can alternatively be used.

GAS TURBINE GENERATOR

Unit 30 represents a gas turbine driven electric generator which combusts clean fuel gas to generate electric power. Fuel gas from unit 28, consisting primarily of CO and $CH_4$, with lesser amounts of $H_2$, $CO_2$, $N_2$ and $C_2$'s, at a pressure from about 220 psig to about 250 psig and at a temperature from about 100° F. to about 400° F., is combusted with excess air in a gas turbine combustor. The hot combustion gases, at a temperature in the range of from about 1900° F. to about 2200° F., expand in a gas turbine that drives a generator that produces electric power. The expanded exhaust gas from the gas turbine, at a temperature from about 800° F. to about 1200° F. and a pressure of from about 5 inches of water to about 10 inches of water, is moved to a heat recovery unit located in unit 32.

HEAT RECOVERY AND STEAM TURBINE GENERATOR

Unit 32 represents a facility for recovering heat from the gas turbine exhaust gas and generating electric power. Hot exhaust gas from unit 30 is flowed to a heat recovery unit where high pressure saturated steam (1250 to 1500 psig) is generated, admixed with saturated high pressure steam generated in the char gasification unit 20, then superheated in the heat recovery unit to a temperature in the range of 900° F. to 1,000° F. This high pressure superheated steam is sent to a steam turbine that drives a generator that produces electric power.

Medium pressure steam (500 to 1000 psig) is also generated in the heat recovery unit and superheated to a temperature in the range of 600° F. to about 1050° F. Part of this medium pressure superheated steam is extracted from the system and sent to the coal preconditioning unit 10. The remaining medium pressure steam is flowed to a medium pressure steam turbine that drives a generator which produces additional electric power. Condensate from the steam turbine condensers is collected and preheated in the heat recovery unit and then re-used as make-up feedwater for generating the high pressure and medium pressure steam.

Methane/CO-rich recycle gas from unit 28 is heated in the heat recovery unit to a temperature in the range of 500° F. to about 850° F. and then sent to the coal preconditioning unit 10.

EXAMPLE

The following example, which refers to FIG. 1, is used to demonstrate the feasibility of the instant invention. A co-generation facility is designed to convert 10,000 tons (moisture, ash free) of Wyoming Powder River Basin coal feed per day to liquid hydrocarbon products, methanol, and electric power. Dry, pulverized coal at 200° F. is fed to a preconditioner unit 10 which is a fluidized bed vessel and contacted with 750 psig, 950° F. steam at a rate of 330,000 pounds per hour and recycled $CH_4$/CO-rich gas from unit 28 heated to 800° F. The preconditioned coal, at a temperature of 550° F., is separated from the steam and gas and fed to the HDP reactor in unit 14 where the feedstock is subjected to rapid volatilization, hydrogenation, and quench. Steam and gas from the preconditioner is sent to a cyclone separator to separate entrained coal particles, then fed to a POX unit 12. In the POX reactor, the steam and recycled gas are reacted (substoichiometrically) with about 126,000 pounds per hour of oxygen to produce a hydrogen-rich reducing gas stream at about 2,400° F. and 725 psig. The hot gas from the POX unit is directly fed to the HDP reactor operating at about 700 psig to heat the coal to about 1,500° F., at which temperature the coal is volatilized. The residence time in the HDP reactor prior to initial quench is about 30 milliseconds. The HDP volatilization product is partially quenched to about 1200° F. with about 150,000 pounds per hour of recycled heavy quench oil and 90,000 pounds per hour of recycle hydrogen. At these conditions, heavy oil is partially cracked to lighter oil and the reactor vapor product is partially hydrogenated.

The hydrogenated HDP vapor is then quenched to about 850° F. with recycled light oil-water mixture recovered in unit 16. Char is separated from the quenched HDP vapor in unit 14 at about 850° F. and 650 psig. The HDP vapor at about 850° F. is cooled in unit 16 to condense heavy oil, light oil, and process water. The heavy oil and light oil are treated in unit 18 to produce BTX, naphtha, and low sulfur fuel oil. The process water collected in unit 16 is stripped to remove dissolved gases and ammonia. The stripped ammonia is then recovered and purified as a co-product. In unit 20, the hot separated char (about 378,000 pounds per hour) is slurried with about 370,000 pounds per hour of stripped process water, containing dissolved organic material, from unit 16. The char slurry at about 350° F. is gasified with about 350,000 pounds per hour of oxygen to produce a sour synthesis gas consisting primarily of carbon monoxide and hydrogen. The sour synthesis gas is combined with sour HDP reactor gas from unit 16 in unit 22, gas purification where sulfur containing gases and $CO_2$ are removed to provide a sweet feed gas for methanol synthesis unit 26. The feed gas to methanol synthesis unit 26 consists of about 56,000 pound-moles per hour of hydrogen, 27,000 pound-moles per hour of carbon monoxide, 6,200 pound-moles per hour of methane, and minor amounts of carbon dioxide, ethane, nitrogen, and water vapor. Part of the $H_2$ and CO in the feed gas are reacted in a once-through methanol synthesis reactor to produce methanol which is separated from the unreacted gases, purified, and sent to storage. Unreacted gases are purged from the methanol synthesis unit and sent to gas separation unit 28.

In unit 28, a hydrogen-rich gas is separated from a $CH_4$/CO-rich gas and recycled to the HDP reactor unit 14 (about 45,000 pound-moles per hour of $H_2$) and to the oil hydrotreated unit 18 (about 4,200 pound-moles per hour of $H_2$). Part of the separated $CH_4$/CO-rich gas, containing about 10,600 pound-moles per hour of CO and 2,100 pound-moles per hour of $CH_4$, is heated to 800° F. in unit 32 and recycled to the coal preconditioning unit 10. The remainder of the $CH_4$/CO-rich gas, containing about 11,700 pound-moles per hour of CO and 3,300 pound-moles per hour of $CH_4$, is sent to a gas turbine generator unit where it is combusted to generate electric power. Hot flue gas from the gas turbine at about 1,000° F. is sent to a heat recovery unit where 1,500 psig steam is generated and then combined with 1,500 psig steam generated in the char gasification unit 20. The combined 1,500 psig steam is then superheated to 950° F. and used in a steam turbine generator to produce electric power. Also, in the heat recovery unit, about 330,000 pound-moles per hour of 750 psig, 950° F. steam is extracted from the steam cycle and sent to the preconditioning unit 10. The remainder of the 750 psig, 950° F. steam is used in a second steam turbine generator to produce additional electric power.

The products produced in this co-generation configuration include 2,510 BPD of BTX; 2,252 BPD of naphtha; 10,480 BPD of fuel oil; 1,000 TPD of methanol; 64 TPD of ammonia; 50 TPD of sulfur; and 230 MW (net) of electric power.

While the invention has been explained in relation to its preferred embodiment, it is understood that various modifications thereof will become apparent to those skilled in the art upon reading the specification and the invention is intended to cover such modifications as fall within the scope of the appended claims.

What is claimed is:

1. A method of generating electrical power in conjunction with production of coal-derived fuel products comprising the steps of
   a. refining a volatile-containing carbonaceous material to produce char, hydrocarbon liquids, and gases by heating a particulate volatile-containing carbonaceous material at a heat rate sufficient to maximize the decomposition and minimize formation of char and condensation products to a volatilization temperature effective to produce a substantially decomposed volatilization products and then contacting said substantially decomposed volatilization product with a hydrogen donor-rich gaseous atmosphere at a hydrogenation temperature effective to minimize formation of condensation products and reduce thermal cracking for a hydrogen residence time effect to produce a hydrogenated volatilization product;
   b. gasifying at least a portion of said char in a gasifier to produce a syngas and high pressure steam;
   c. utilizing said high pressure steam to turn a steam electrical generating turbine;
   d. utilizing said syngas to produce methanol and purge gas in a once-through methanol synthesis;
   e. utilizing the purge gas as a fuel for a gas electric generating turbine; and
   f. transferring at least a portion of the waste heat from said electric generating turbine for use as at least part of the heat to carry out the refining.

2. The method of claim 1 wherein said refining step further comprises producing a stabilized hydrogenated product by adjusting the temperature of said hydrogenated volatilization product to a stabilization temperature effective to substantially terminate formation of condensation products and thermal cracking of said hydrogenated volatilization product.

3. The method of claim 1 wherein the heating rate in said refining step is at least about 10,000° F. per second and said volatilization temperature is from about 1,000° F. to about 2,000° F.

4. The method of claim 1 wherein said hydrogenation temperature is from about 900° F. to about 1,500° F. and said hydrogenation residence time is from about 0.1 seconds to about 5.0 seconds.

5. The method of claim 2 wherein said stabilization temperature is below about 1,000° F.

6. The method of claim 1 wherein said hydrogenation temperature is effected by direct partial quench.

7. The method of claim 6 wherein said direct partial quench is effected by using hydrogen donor-rich gas, or heavy hydrocarbon process liquid which heavy hydrocarbon process liquid is thermally cracked to produce lighter process liquids during said partial quench, or mixtures thereof.

8. The method of claim 1 wherein said hydrogen donor-rich gaseous atmosphere is obtained in substantial part from said carbonaceous material and wherein said hydrogen donor-rich gaseous atmosphere and said volatilizing temperatures are produced in substantial part in a partial oxidation reaction wherein steam and hydrodisproportionation recycle gas rich in methane and carbon monoxide are reacted with a sub-stoichiometric amount of oxygen.

9. The process of claim 1 wherein said carbonaceous material is selected from a group consisting of coals, lignites, low rank and waste coals, peats, and mixtures thereof.

* * * * *